May 19, 1959  C. C. BACH ET AL  2,886,995
DEVICE FOR CUTTING AND STRIPPING INSULATED WIRE
Filed June 19, 1957  3 Sheets-Sheet 3
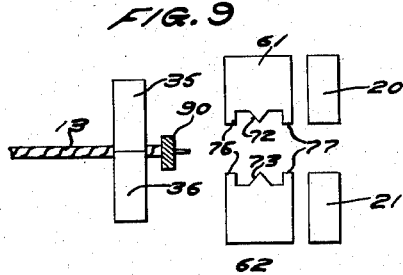
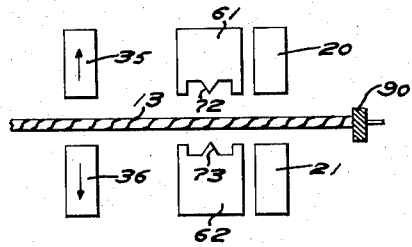
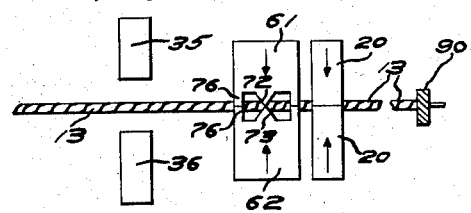
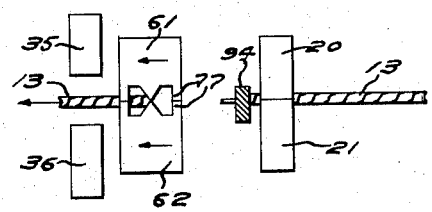
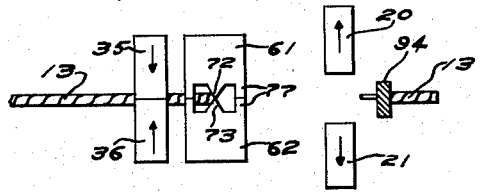
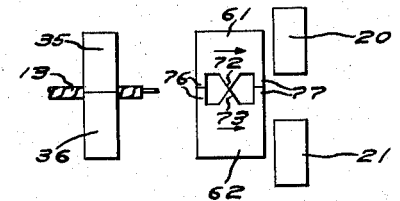
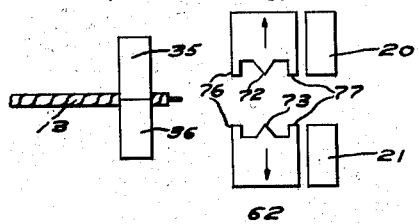
INVENTORS
C.C. BACH
H.F. RUNGE
BY C.B. Hamilton
ATTORNEY

United States Patent Office 2,886,995
Patented May 19, 1959

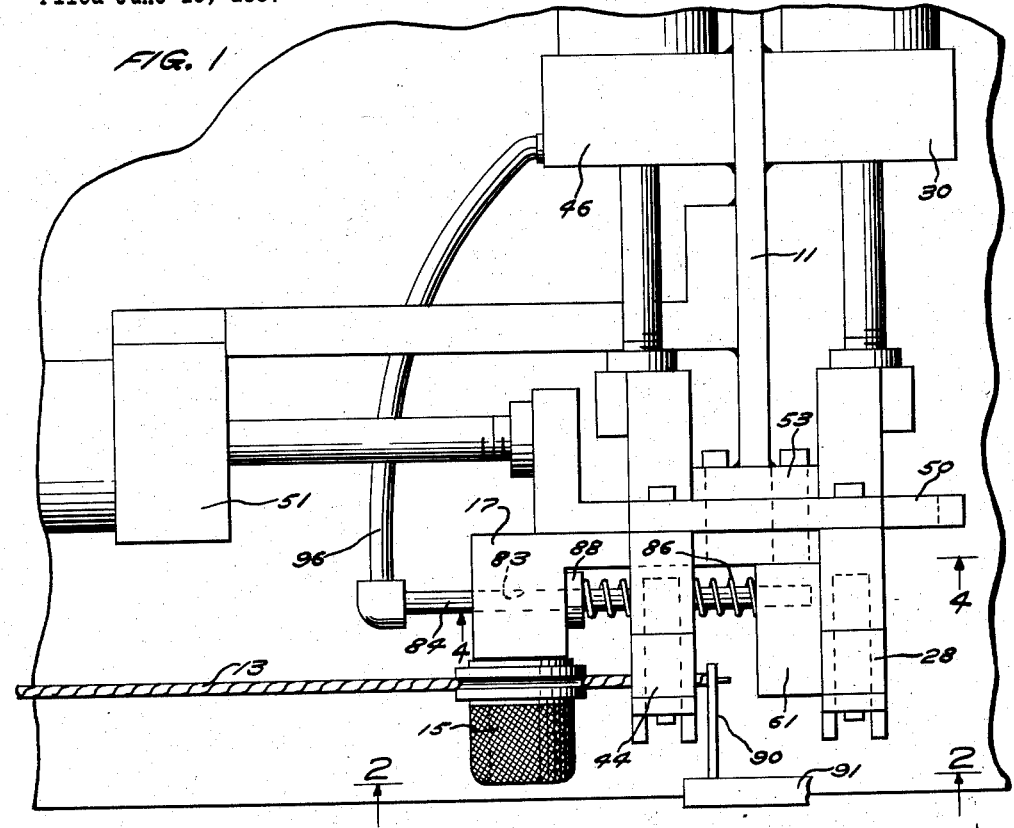

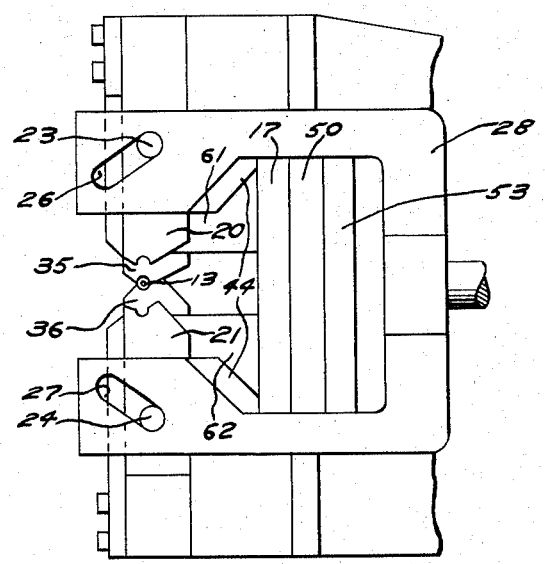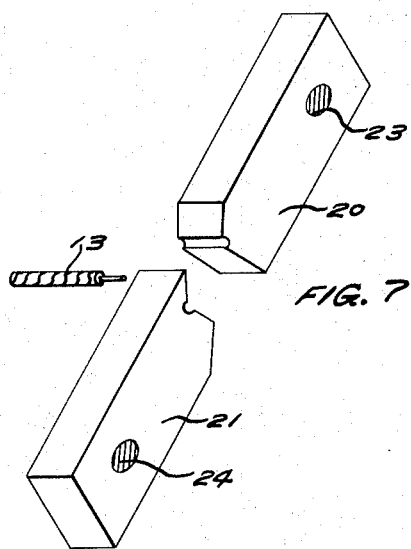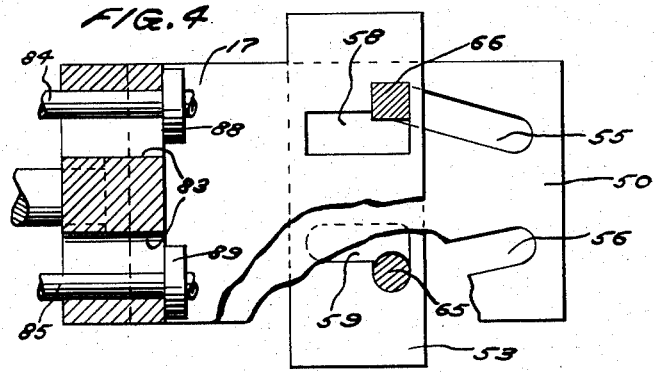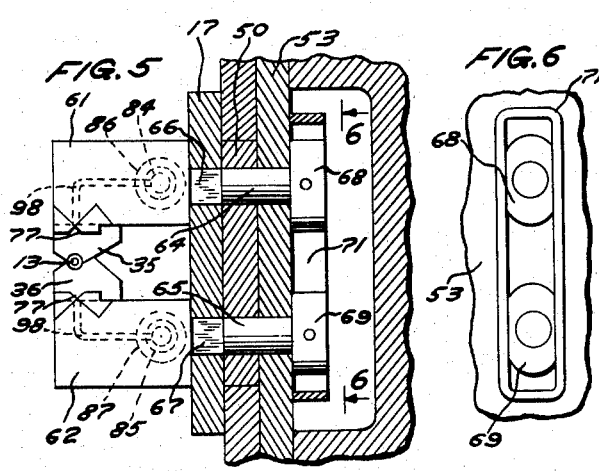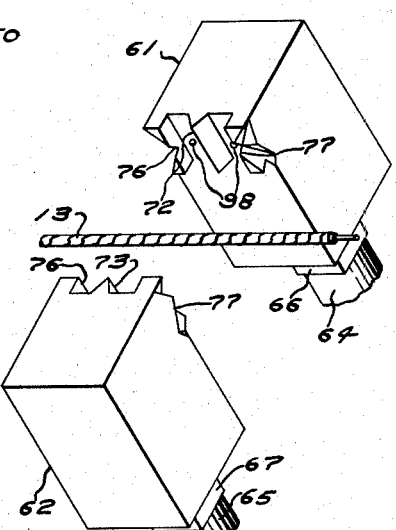

---

2,886,995

DEVICE FOR CUTTING AND STRIPPING INSULATED WIRE

Chester C. Bach, Berwyn, and Heinz F. Runge, Brookfield, Ill., assignors to Western Electric Company, Incorporated, New York, N.Y., a corporation of New York Application June 19, 1957, Serial No. 666,523

8 Claims. (Cl. 81—9.51)

This invention relates to devices for cutting and stripping insulated wire and more particularly to devices for cutting jumper wires from a continuous wire supply and for stripping insulation from both ends of each jumper wire.

In wire cutting and stripping machines used prior to this time, it has been a common practice to provide a pair of stationary jaws for cutting insulation on a wire and a pair of wire-gripping jaws movable relative to the cutting jaws for pulling the wire to strip the insulation therefrom. This has often resulted in an overly complicated device having an excessive number of moving parts, especially where both ends of a wire are to be stripped. With this problem in mind, one of the objects of this invention is to provide a wire cutting and stripping device having stationary jaws for gripping a wire and also having cutting and stripping jaws movable relative to the gripping jaws for removing insulation from the ends of the wire.

Another object of this invention is to provide a new and novel device for cutting jumper wires from a continuous wire supply and for stripping insulation from both ends of each wire.

A further object of this invention is to provide a device having two spaced pairs of wire gripping jaws and a pair of cooperating cutting and stripping jaws which are movable between and relative to the gripping jaws for cutting a jumper wire from a continuous supply and for removing insulation from both ends thereof.

With these and other objects in mind, the present invention contemplates spaced first and second pairs of gripping jaws movable together for holding a wire extending from a supply reel. A pair of cutting and stripping jaws, positioned between the first and second pairs of gripping jaws, are closed to sever the wire and insulation at one point and to sever the insulation at points on opposite sides of the cut made in the wire. The first pair of gripping jaws are closed to hold the severed jumper wire and the closed cutting and stripping jaws are moved toward the second pair of gripping jaws to strip the insulation from the trailing end of the severed jumper wire. The second pair of gripping jaws are then closed to hold the wire extending from the supply reel and the cutting and stripping jaws are moved toward the first pair of gripping jaws to strip the insulation from the leading end of the wire. Welding guns of a well-known type are moved to engage the stripped ends of the wire to carry it into position to be welded to an electrical component.

Other objects and advantages of the invention will become apparent by reference to the following detailed description and the accompanying drawings illustrating a preferred embodiment of the invention, in which Fig. 1 is a fragmentary plan view of a device embodying the principles of the present invention;

Fig. 2 is a front view of the device taken on line 2—2 of Fig. 1 showing a second pair of gripping jaws holding a wire which has the leading end stripped of insulation;

Fig. 3 is a fragmentary view taken on line 3—3 of Fig. 2 depicting the general shape of one of the camming members which closes the gripping jaws;

Fig. 4 is a fragmentary sectional view taken on line 4—4 of Fig. 1 illustrating the configurations of the slots in various members through which pin portions of the cutting and stripping jaws extend;

Fig. 5 is a fragmentary sectional view taken on line 5—5 of Fig. 2 showing the manner in which the cutting and stripping jaws are mounted on the device;

Fig. 6 is a fragmentary view taken on line 6—6 of Fig. 5 showing flat sided collars secured to pin portions of the cutting and stripping jaws and slidably mounted in a guide member for preventing misalignment of the cutting and stripping jaws as they are actuated;

Fig. 7 is an enlarged perspective view of a pair of gripping jaws;

Fig. 8 is an enlarged perspective view of the cutting and stripping jaws showing the various cutting and stripping blades;

Fig. 9 is a diagrammatic front view showing the cutting and stripping jaws and the first pair of gripping jaws in normal open position and the second pair of gripping jaws holding a wire having its stripped leading end held by a first welding gun;

Fig. 10 illustrates the step of operation following that shown by Fig. 9 wherein all pairs of jaws are open and the first welding gun has moved the leading end of the wire a distance equal to the length of wire to be cut from the wire supply;

Fig. 11 is a view showing the next operating step of the structure shown in Fig. 10 with the cutting and stripping jaws closed to cut the wire at one point and the insulation at points on opposite sides of the cut made in the wire, and the first pair of gripping jaws closed to hold the severed jumper wire;

Fig. 12 is a view of the next sequential operation of the disclosure of Fig. 11 after the cutting and stripping jaws have moved away from the first pair of gripping jaws to strip the insulation from the trailing end of the severed jumper wire;

Fig. 13 shows the next operating step of the structure of Fig. 12 with the second pair of gripping jaws closed and the first pair of gripping jaws opened;

Fig. 14 shows the succeeding operations of the structure of Fig. 13 after the cutting and stripping jaws have moved away from the second pair of gripping jaws for stripping the insulation from the leading end of the wire extending from the supply reel; and Fig. 15 discloses the next operating step of the disclosure of Fig. 14 with the cutting and stripping jaws and the first pair of gripping jaws opened.

Referring now in detail to the drawings, a base 11 is shown supporting a reel 12 (Fig. 2) containing a supply of wire 13 to be cut into short lengths for use as jumper wires. The wire 13 extends from the reel 12 and passes between a pair of tensioning rolls 15 and 16 (Figs. 1 and 2) mounted on a bracket 17 secured to the base 11. A first pair of gripping jaws 20 and 21 slidably mounted on the bracket 17 for cooperating to grip the wire 13 are provided with pins 23 and 24 which pass through camming slots 26 and 27 (Fig. 3), respectively, in a camming member 28 slidably mounted on the bracket 17 and actuated by an air cylinder 30. When the air cylinder 30 is actuated, the camming member 28 moves to the right (Fig. 3) whereupon the camming slots 26 and 27 cause the pins 23 and 24 to move together thereby closing the first pair of gripping jaws 20 and 21 upon the wire 13 to hold it.

A second pair of gripping jaws 35 and 36 slidably mounted on the bracket 17 are provided with pins 38 and 39 which extend through camming slots 41 and 42 in a camming member 44 having the same configuration as the camming member 28. The camming member 44 is actuated by an air cylinder 46 mounted on the base 11.

A slide member 50 actuated by an air cylinder 51 and slidably mounted between the bracket 17 and a plate 53 (Fig. 1) secured to the base 11 is provided with a pair of converging cam slots 55 and 56 (Fig. 4). The bracket 17 and the plate 53 are each provided with L-shaped slots 58 and 59, respectively, situated as illustrated in Fig. 4. A pair of cutting and stripping jaws 61 and 62 are provided with pin portions 64 and 65 which extend through the L-shaped slots 58 and 59 and the converging slots 55 and 56 and are pinned to flat sided collars 68 and 69. Reciprocation of the slide member 50 will thus move the jaws 61 and 62 into and out of cooperation along L-shaped paths. Portions 66 and 67 of the pin portions 64 and 65 are square in cross section and are positioned in the slots 58 in the frame 17 to aid in preventing rotation of the jaws 61 and 62 during operation. The collars 68 and 69 are slidably positioned in a guide member 71 for maintaining the cutting and stripping jaws 61 and 62 in alignment as they are actuated.

The cutting and stripping jaws 61 and 62 are provided with cooperating cutting blades 72 and 73, respectively, for completely severing the wire 13 and its insulation at one point. The jaws 61 and 62 are also provided with cooperating pairs of insulation severing and stripping blades 76 and 77 positioned on opposite sides of the blades 72 and 73. The pairs of blades 76 and 77 cut the insulation as the jaws 61 and 62 are closed and then strip the insulation as the jaws 61 and 62 are moved laterally.

A pair of tubular members 84 and 85 rigidly attached to the jaws 61 and 62, respectively, extend through slots 83 in a projecting portion of the bracket 17 and are provided with compression springs 86 and 87 which urge the jaws 61 and 62 to the right (Figs. 1 and 2). The springs 86 and 87 also bear against collars 88 and 89 slidably mounted on the tubular members 84 and 85 and are adapted to maintain a slidable engagement with the projecting portion of the frame 17. The springs 86 and 87 force the collars 88 and 89 to lie flat against the projecting portion of the frame 17, thus causing the tubular members 86 and 87 to remain parallel for holding the cutting and stripping jaws in alignment as they are actuated.

The tubular members 84 and 85 are connected by hoses 96 and 97 to an exhaust valve on the air cylinder 46. The openings through the tubular members 84 and 85 are also connected to exhaust openings 98 positioned on opposite sides of the cutting blades 72 and 73 on the jaws 61 and 62. When the air cylinder 46 is actuated to open the second pair of gripping jaws 35 and 36, air is passed from the air cylinder 46 through the hoses 96 and 97, the tubular members 84 and 85, and the exhaust openings 98 to remove any pieces of insulation which may remain between the jaws 61 and 62.

A first welding gun 90 (diagrammatically illustrated in Figs. 1, 2, 9, 10 and 11) of a well-known type is moved by a mechanism 91 (Fig. 1) of a well-known type into position to engage and hold the leading end of the wire 13 after the insulation has been stripped therefrom (Fig. 9). The welding gun 90 is then moved by the mechanism 91 to carry the leading end of the wire a distance equal to the length of wire to be cut from the supply reel 12 (Fig. 10). After the wire has been cut and the insulation stripped from the trailing end thereof, a second welding gun 94 is moved into position by the mechanism 91 to grip the stripped trailing end of the wire and to carry it into position to be welded onto the electrical component.

In operation of the device, the first welding gun 90 is moved by the mechanism 91 to grip the stripped leading end of the wire 13 (Fig. 9). The air cylinder 46 is then actuated to open the jaws 35 and 36 and the mechanism 91 is actuated to move the first welding gun 90 to advance the wire 13, as illustrated in Fig. 10. When the leading end of the wire 13 is properly positioned, the air cylinder 30 is actuated to close the first pair of gripping jaws 20 and 21 upon the wire 13 and the air cylinder 51 is actuated to move the slide member 50 to the left (Fig. 4). As the slide member 50 moves to the left the slots 55 and 56 cam the pin portions 64 and 65 of the cutting and stripping jaws 61 and 62 together to close these jaws. As the jaws 61 and 62 close, the cutting blades 72 and 73 sever the wire 13 and its insulation and the blades 76 and 77 sever the insulation on the wire 13.

Further movement of the slide member 50 carries the closed cutting and stripping jaws to the left (Fig. 12) to strip the insulation from the trailing end of the wire held by the closed first pair of jaws 35 and 36, whereupon the mechanism 91 moves the second welding gun 94 to grip the stripped trailing end of the severed jumper wire.

As the severed jumper wire is carried into welding position by the welding guns 90 and 94, the air cylinder 46 is actuated to move the second pair of gripping jaws 35 and 36 into closed relationship to hold the wire 13, as best illustrated in Fig. 13. The air cylinder 51 is then actuated to move the slide member 50 to the right (Fig. 4), moving the jaws 61 and 62 toward the right (Fig. 4) to strip the insulation from the leading end of the wire 13. The first welding gun 90 is then moved into position by the mechanism 91 to grip the stripped end of the wire 13, whereupon above-described procedure is repeated.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for cutting and stripping insulation from wire, comprising supporting means, a first pair of gripping jaws mounted on the supporting means for holding an insulated wire, a second pair of gripping jaws mounted on the supporting means for holding the wire, a pair of cutting and stripping jaws mounted between the pairs of gripping jaws and movable together and then laterally relative to said pairs of gripping jaws, and means for so moving said jaws for cutting the wire and stripping insulation from the ends of the wire formed by the cutting operation.

2. A device for cutting and stripping insulated wire, comprising supporting means, a first pair of stationary gripping jaws mounted on the supporting means for holding an insulated wire, means for actuating said first pair of jaws, a second pair of stationary gripping jaws mounted on the supporting means for holding the wire, means for actuating said second pair of jaws, a pair of cooperating cutting and stripping jaws mounted on the supporting means for lateral movement between and relative to said first and said second stationary pairs of gripping jaws, said cutting and stripping jaws having a plurality of cooperating blades for severing the wire at one point and for severing the insulation on the wire at points spaced on opposite sides of said one point, and means for closing the cutting and stripping jaws and for then moving the closed cutting and stripping jaws laterally in one direction with the first pair of gripping jaws actuated and in the opposite direction with the second pair of gripping jaws actuated.

3. A device for cutting and stripping insulated wires, comprising supporting means, a pair of cooperating jaws mounted on the supporting means on opposite sides of an insulated wire and having a plurality of blades for severing the wire and insulation at one point thereon and for severing the insulation at points spaced on opposite sides of said one point, means on the supporting means for moving said cooperating jaws into closed relationship to cut the wire and insulation and for reciprocating the closed jaws laterally in a direction longitudinal to the wire, first stationary gripping means on the supporting means for holding the wire when said cooperating jaws are moved in a first direction longitudinally of the wire, and second stationary gripping means on the supporting means for holding the wire when said cooperating jaws are moved in the other direction longitudinally of the wire.

4. A device for cutting and stripping insulated wire, comprising supporting means, a first pair of gripping jaws mounted on the supporting means for holding an insulated wire, means on the supporting means for actuating said first pair of jaws, a second pair of gripping jaws mounted on the supporting means for holding the wire, means on the supporting means for actuating the second pair of gripping jaws, a pair of cooperating cutting and stripping jaws secured to and carried by portions movably mounted on the supporting means in L-shaped paths, said cutting and stripping jaws having a pair of cooperating cutting blades for severing the wire and insulation at one point thereon and also having a plurality of pairs of cooperating stripping blades for severing the insulation at points spaced on opposite sides of said one point, and a movable member on said supporting means having camming slots receiving said portions for actuating the cutting and stripping jaws into closed relationship and for then moving said jaws laterally.

5. A device for cutting and stripping insulated wire, comprising a base, a first pair of stationary gripping jaws on the base for holding a wire to be cut and stripped, means for actuating the first pair of gripping jaws, a second pair of stationary gripping jaws mounted on the base, means on the base for actuating said second pair of jaws, a plate secured to the base and having a pair of L-shaped slots, a pair of cutting and stripping jaws positioned between said first and second pairs of gripping jaws and having portions extending through said L-shaped slots and also having a pair of cooperating cutting blades and a plurality of pairs of cooperating insulation severing and stripping blades positioned on opposite sides of the cutting blades, and a member movable relative to said plate and having camming slots receiving said portions of said cutting and stripping blades for moving the cutting and stripping jaws into cooperation along L-shaped paths for cutting and stripping thte wire held by the first and second pairs of gripping jaws, portions of said paths extending laterally of the stationary gripping jaws.

6. A device for cutting and stripping insulated wire, comprising a base, a first pair of gripping jaws movably mounted on the base for holding an insulated wire to be cut and stripped, first camming means on the base for closing said first pair of gripping jaws, means for actuating the first camming means, a second pair of gripping jaws movably mounted on the base, second camming means on the base for closing said second pair of gripping jaws, means for actuating the second camming means, a pair of cutting and stripping jaws movably mounted on the base and each having a pin portion, a slide member movably mounted on the base and having cam slots for receiving the pin portions of the cutting and stripping jaws to actuate said cutting and stripping jaws, and means for actuating the slide member to actuate the jaws.

7. A device for cutting and stripping insulated wires, comprising a base, a frame mounted on the base and having a pair of L-shaped slots positioned in back-to-back relationship, a slide member mounted on the base and having a pair of spaced converging slots, a portion of each converging slot being in alignment with a portion of one of the L-shaped slots, a pair of cutting and stripping jaws each having a pin portion extending through said aligned portions of the L-shaped and converging slots, means for actuating the slide member to move the cutting and stripping jaws into cooperation along L-shaped paths guided by the L-shaped slots, said cutting and stripping jaws also having a pair of cooperating cutting blades for severing the wire and insulation at one point thereon and spaced pairs of insulation cutting blades for severing the insulation at points spaced on opposite sides of said one point, a first pair of gripping jaws slidably mounted on the frame, means for closing said first pair of jaws to hold the wire, a second pair of gripping jaws slidably mounted on the frame, and means for closing said second pair of gripping jaws to hold the wire, said first and said second pairs of gripping jaws being mounted on opposite sides of the cutting and stripping jaws.

8. In a wire cutting and stripping device; a base; a frame mounted on the base; a first pair of gripping jaws movably mounted on the base for holding the wire; a first camming member slidably mounted on the frame for closing the first pair of gripping jaws; a second pair of gripping jaws movably mounted on the frame for holding the wire; a second camming member slidably mounted on the frame for closing the second pair of jaws; said second pair of jaws being spaced longitudinally along the wire from said first pair of jaws; a pair of cooperating cutting and stripping jaws movably mounted on the frame between the first and second pairs of gripping jaws and each having a pin portion; a slide member movably mounted on the frame and having cam slots for receiving the pin portions of the cutting and stripping jaws to close said jaws and then move the closed jaws laterally; means for reciprocating the slide member to close the cutting and stripping jaws, reciprocate said jaws toward the second pair of gripping jaws and back toward the first pair of gripping jaws, and open said cutting and stripping jaws; said cutting and stripping jaws being provided with a pair of cooperating cutting blades for severing the insulation and wire at one point thereon when said jaws are closed and a plurality of pairs of insulation severing and stripping blades positioned on opposite sides of the cutting blades for severing the insulation when said cutting and stripping jaws are closed; means on the base for actuating the first camming member to close the first pair of gripping jaws as the cutting and stripping jaws are moved toward the second pair of gripping jaws; and means on the base for actuating the second camming member to close the second pair of gripping jaws as said cutting and stripping jaws are moved toward said first pair of gripping jaws.

References Cited in the file of this patent

UNITED STATES PATENTS

| 1,733,294 | Cross | Oct. 29, 1929 |
| 1,787,658 | Andren | Jan. 6, 1931 |
| 2,285,167 | Montgomery | June 2, 1942 |
| 2,395,374 | Lembitz | Feb. 19, 1946 |
| 2,774,130 | Folkenroth | Dec. 18, 1956 |
| 2,811,063 | Eubanks | Oct. 29, 1957 |